April 7, 1953 D. F. ALEXANDER 2,634,318
APPARATUS FOR MEASURING VOLTAGE DROP
Filed Jan. 18, 1951

INVENTOR.
Donald F Alexander
BY
Willits Hardman and Fehr
Attorneys

Patented Apr. 7, 1953

2,634,318

UNITED STATES PATENT OFFICE 2,634,318

APPARATUS FOR MEASURING VOLTAGE DROP

Donald F. Alexander, Oakwood, Ohio, assignor to General Motors Corporation, Dayton, Ohio, a corporation of Delaware Application January 18, 1951, Serial No. 206,543

4 Claims. (Cl. 175—183)

This invention relates to electrical apparatus and more particularly to apparatus for testing the load carrying characteristics of an electrical alternating current power supply.

The increasing application of motorized loads on 115 volt alternating current systems demands a close scrutiny of both the nominal and the starting voltages available for the connection of any particular motor to any particular supply source. In particular, the effective series impedance in the line from the generator to the load must be reasonably low if adequate voltages are to be maintained when the heavy load of starting a motor is applied. Excessive impedance may be in the power supply to the user's meter or in the branch circuits in the premises. The average installer and serviceman finds this difficult to measure and evaluate with the test equipment such as a voltmeter and an ammeter, ordinarily available to him.

It is an object of my invention to provide a simple apparatus for determining which receptacles and which points of connection with the power supply are capable of sustaining the load applied by any particular electrical appliance within the permissible limits of a voltage drop.

It is another object of my invention to provide a simple apparatus for determining the voltage at any point of connection both with a load and and without a load.

It is another object of my invention to provide a simple apparatus for measuring the voltage drop under load of a power supply connection by a simple scalar measurement.

It is another object of my invention to provide a simple apparatus for determining the best place of connection to the power supply for any particular electrical load.

It is another object of my invention to provide a simple apparatus which by simple manipulation will indicate the load carrying characteristic of a power supply connection by a simple scalar indication.

It is another object of my invention to provide a simple apparatus for determining the voltage drop within the residence circuit caused by a test load and the voltage drop at the power supply connection caused by the same test load to fix the responsibility for poor voltage regulation.

To attain these objects I have provided in the first form of my invention a simple testing apparatus including a transformer having its primary winding connected across the points of connection to the power supply and its secondary winding connected to a potentiometer and one side of this power supply in such a way that this combination will boost the voltage when the adjustable tap of the potentiometer is connected through a voltmeter to the other side of the power supply. A switching arrangement is provided so that the voltmeter can be connected either alone across the power supply connection or in series with the potentiometer but in parallel with an electrical test load across the power supply connection. In this second switching position, the adjustable tap of the potentiometer is adjusted to bring the voltmeter reading with the connected test load to the same value as the no load voltmeter reading. The potentiometer is provided with a scale to give a direct indication of the drop in voltage due to the imposition of the test load or an indication of the quality of the power supply so far as voltage regulation is concerned.

In the second form, the step up portion of an auto transformer is connected in a loop circuit with a sliding tap potentiometer and a trimmer variable resistance. The test load and the remaining portion of the auto transformer are connected in parallel circuit with each other and in series with a single pole single throw switch. This circuit is connected across the power supply connections. The voltmeter is connected between the sliding tap and the same supply connection to which the switch is connected. When the switch is open, the voltmeter alone is across the power supply and will indicate the no load voltage. When the switch is closed, the transformer and the test load are connected across the power supply and the tap is adjusted to make the voltmeter read the same value as the no load voltage. A scale cooperating with the sliding tap indicates the quality of the circuit. This particular form has the advantage that regardless of the operation of the loading switch, the voltmeter is always connected to be energized.

The third form of the invention is similar to the first form except that the two coil transformer and adjustable potentiometer arrangement therein are replaced by an adjustable step-up auto-transformer.

In the fourth form of the invention a scale indication is provided through the use of a means of changing the voltage relationship without the use of a voltage boosting transformer. This is accomplished by the use of a variable resistance which is connected in series with a potential indicator. The variable resistance is arranged so that a fixed resistance is connected in series with the potential indicator under no load conditions, and a reduced variable resistance is connected in series with the potential indicator under the loaded condition to achieve an indication through the use of an adjustable tap and a scale.

This application is a continuation in part of my copending application Serial No. 124,435, filed October 29, 1949, which in turn was copending and is a continuation-in-part of my application Serial Number 606,339, filed July 21, 1945, which was abandoned after October 29, 1949.

Further objects and advantages of the present invention will be apparent from the following description, reference being had to the accompanying drawing, wherein a preferred form of the present invention is clearly shown.

Figure 1:
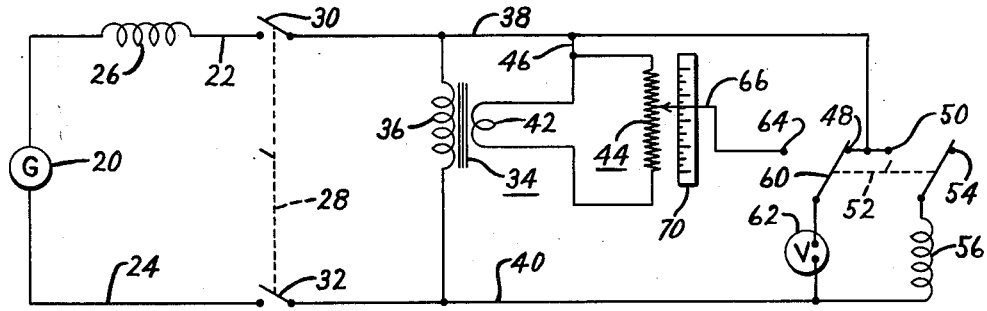
Figure 1 is a wiring diagram of one form of a testing apparatus embodying my invention connected to a source of alternating current.

Referring now to the drawing, there is shown in Figure 1 a generator 20 with supply conductors 22 and 24 having a certain amount of impedance which is represented as the impedance 26. To determine the load carrying characteristic of any particular source of supply I have provided a connecting means 28 providing the connections 30 and 32 with the supply conductors 22 and 24. This connecting means may be in the form of an ordinary receptacle-plug combination or pairs of bare wire ends or a switch, or any other convenient form. A transformer 34, such as an ordinary 10 to 1 voltage ratio bell ringing transformer, has its primary winding 36 connected across the conductors 38 and 40 which connect directly to the connections 30 and 32.

The secondary winding 42 of the transformer is connected to the ends of an adjustable potentiometer 44 in a loop circuit arrangement. This loop circuit is connected by the conductor 46 with the conductor 38 in such a way that the secondary winding 42 has its polarity arranged so that it will boost the voltage between the potentiometer tap 66 and the conductor 40 above the voltage across the supply conductors 22 and 24. The supply conductor 38 connects to the contacts 48 and 50 of the double pole double throw switch means 52. One switch leg 54 of the switch means 52 connects to a test impedance 56. For ordinary purposes, where the maximum appliance or other load is principally a resistance load, I prefer to employ an ordinary resistance coil of 20 ohms as the test load, providing a test current of about 5¾ amperes at 115 volts. This is a sufficient load to provide a voltage drop which can be easily determined on the voltmeter and yet is small enough to minimize any problem of heat dissipation.

The other switch leg 60 of the double throw switch 52 is connected to a voltmeter 62 which in turn is connected to the conductor 40. To avoid physical damage to the voltmeter 62 and to make this voltmeter 62 available for other purposes, it may be connected by a simple plug connection. The remaining live contact 64 of the switch 52 is connected to the tap 66 of the adjustable potentiometer 44. A scale 70 is provided for reading the adjusted position of the tap 66 of the potentiometer 44.

To use the testing apparatus, the connecting means 28 is inserted or connected to the power connection to which it is desired to connect the electrical appliance. The switch 52 is then thrown to the position shown in the figure wherein the voltmeter 62 is connected directly across the supply connections 30 and 32 to give a voltage reading without test load. The switch means 52 is then operated to move the switch blade 54 into contact with the live contact 50 and the switch blade 60 into contact with the contact 64. The tap 66 is then adjusted until the voltmeter 62 indicates the same value as it did under the no load condition. The position of the tap 66 with reference to the scale 70 indicates the amount of additional voltage which was supplied by the secondary winding 42 to replace the drop in voltage caused by the application of the test load.

The position of the tap 66 relative to the scale 70 will directly indicate the relative ability of a supply circuit to maintain the supply voltage under the application of any load. The scale 70 is a linear scale and may be marked in any desired values but it is preferably arbitrarily calibrated to indicate the value of $$\frac{\text{Voltage no load} - \text{Voltage under test load}}{\text{Current under test load}}$$

This relationship may be called the "Q" or quality factor and is a fixed value for any one particular power supply connection independent of voltage and current values of the particular power supply circuit.

This fixed characteristic or quality factor "Q" for any one particular power supply connection is independent of voltages and currents as indicated by the following mathematical investigation:

Let $E_0$ equal the no load voltage at the connection.
Let $E_1$ equal the voltage under load.
Let $K$ equal the transformer ratio.
Let $S$ equal the percentage of full scale adjustment on the potentiometer.
Let $R$ be the test load in ohms.
Let $I_1$ be the current under the test load.

$$Q = \frac{E_0 - E_1}{I_1}$$

$$E_0 - E_1 = E_1 K S$$

$$\frac{E_0 - E_1}{I_1} = \frac{E_1 K S}{I_1}$$

but $$\frac{E_1}{I_1} = R$$

$$Q = RKS$$

If an appliance manufacturer intends that my testing device be used to determine where his appliances may be connected, it is necessary for him to supply the tester with certain information. He must decide upon and make available the maximum quality factor values permitted for each appliance at each no load voltage within the area of satisfactory operation. The tester who is to install the appliance will then evaluate the no load test voltage and the quality factor value as indicated by the scale 70 for the electrical outlet to which the appliance is to be connected. If the quality factor value evaluated by the serviceman is less than the value specified by the manufacturer, then it is permissible for him to connect the appliance to that outlet. If the quality factor value as read upon the arbitrary scale 70 exceeds the permitted quality factor value, then it is not permissible for the tester to connect the appliance to that outlet and a better outlet must be provided for the appliance.

Such a test apparatus can be made very light and simple so that it can be used by any one much more conveniently and effectively than trying out each receptacle with the actual load to be installed. The scale 70 is preferably additionally marked to indicate the permissible quality factor or the limit of permissible voltage drop for each appliance to be installed so that if the position of the tap 66 upon the completion of the test is beyond the limit, the tester will know that the particular appliance should not be connected to that power supply outlet.

Figure 2:
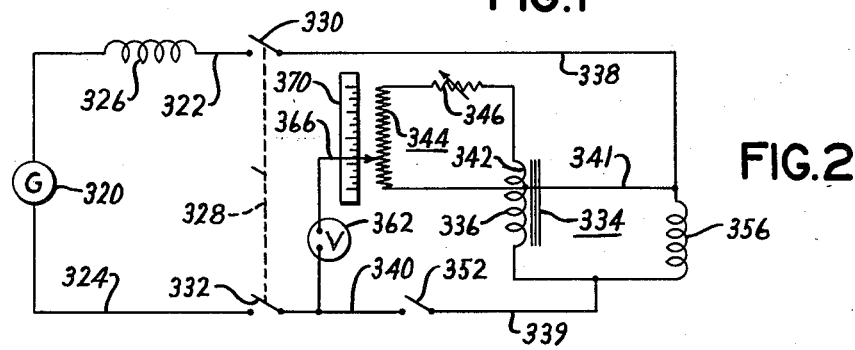
Fig. 2 is a wiring diagram of a testing apparatus embodying a modified form of the invention connected to a source of alternating current.

A simplified form is shown in Fig. 2. As in Fig. 1, there is shown a generator 320 with supply conductors 322 and 324 having a certain amount of impedance which is referred to as the impedance 326. To evaluate the relative ability of a supply circuit to maintain the supply voltage under the application of a load, I have provided a connecting means 328 providing the connections 330 and 332 for connecting my testing apparatus with the supply conductors 322 and 324. This connecting means may be in the form of an ordinary receptacle plug or a pair of bare wire ends or any other convenient form.

Instead of the two winding type of transformer shown in Fig. 1, there is provided an auto transformer 334. The auto transformer 334 has the terminal of its step up portion 342 connected to a variable resistance 346 which serves as a factory calibrating means to compensate for expected variations in manufactured parts. This variable resistance 346 is connected to one of the fixed terminals of the adjustable potentiometer 344. The other fixed terminal of the potentiometer 344 is connected to the tap connection of the auto transformer 334. This tap connection is also connected by the branch conductor 341 to the conductor 338 which connects directly to the supply connection 330. The conductor 338 connects directly to one of the terminals of a fixed test impedance 356 which is similar to the fixed test impedance 56 shown in Fig. 1. The value and characteristics of this test impedance 356 are selected according to the same principles as the fixed test impedance 56 in Fig. 1. It may be in the form of an ordinary resistance coil having a value of 20 ohms for example.

The main portion 336 of the auto transformer and the test impedance 356 are connected in parallel circuit with each other. The adjacent terminals of the auto transformer 334 and the test load 356 are connected together and connected to the conductor 339. This conductor 339 is connected by a single pole single throw switch 352 with the conductor 340 which connects directly with the supply connection 332. The adjustable tap 366 is connected to one of the terminals of a voltmeter 362. The second terminal of the voltmeter 362 is connected to the conductor 340. To increase the usefulness of the voltmeter 362 so as to make it possible to be separately carried and separately used, it is preferred that the connection of the voltmeter 362 with the adjustable tap 366 and the conductor 340 be made by a simple plug connection. A scale 370 is provided for reading the adjusted position of the tap 366 of the potentiometer 344.

To use the testing apparatus, the connection means 328 is inserted or connected to any power connection which it is desired to test for determining its suitability to connect any particular electrical appliance. The switch 352 is repeatedly opened and closed and the adjustable tap is moved to a position where the reading of the voltmeter 362 is the same regardless whether the switch 352 is in the open or closed position. In Fig. 1, during the interval when the switch 352 is being operated from one position to another, one terminal of the voltmeter 62 is disconnected so that the voltmeter will tend to return to 0. In the form shown in Fig. 2, the voltmeter 362 is always energized substantially to the no load voltage reading regardless whether the switch 352 is opened or closed and has no tendency to return to 0 as long as the connection 328 remains connected. This, of course, assumes that the adjustable tap 366 is being adjusted to approximately the proper position to make the meter readings the same.

As in the form shown in Fig. 1, the quality of the electrical power supply in the connections 330 and 332 is directly indicated by the proper adjusted position of the adjusted tap 366. The values supplied will be substantially the same and the mathematical investigation applying to Fig. 1 applies equally to Fig. 2. This form is more practical since the voltmeter is continuously energized while the apparatus is in use and the more simple and more easily operated single pole switch 352 replaces the more cumbersome double throw double pole switch of Fig. 1.

Figure 3:
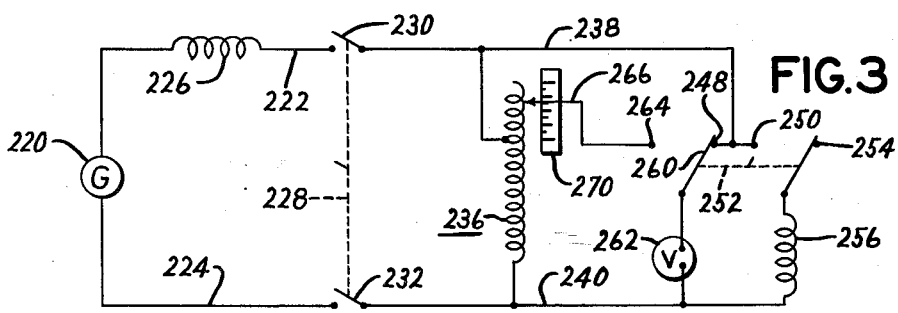
Fig. 3 is a wiring diagram of a testing apparatus embodying another modified form of my invention connected to a source of alternating current.

In Figure 3, there is shown an alternating current generator 220 with supply conductors 222 and 224 having a certain amount of impedance which is represented as the impedance 226. To determine the load carrying characteristic of any particular source of supply, I have provided a connecting means 228 providing the connections 230 and 232 with the supply conductors 222 and 224. This connecting means may be in the form of an ordinary receptacle block or a pair of bare wire ends or a switch or any other convenient form. An adjustable boosting autotransformer 236 has its fixed terminals connected across the conductors 238 and 240 which connect directly to the connections 230 and 232. The auto-transformer 236 at its upper end is provided with an adjustable tap 266 providing a means for obtaining various voltages higher than the voltage existing across the connections 230 and 232.

The supply conductor 238 connects to the contacts 248 and 250 of the double pole, double throw, switch means 252. One switch leg 254 of the switch means 252 connects to one terminal of a fixed test impedance 256. The second terminal of the fixed test impedance 256 is connected to the conductor 240.

The other switch leg 260 of the double throw switch 252 is connected to a voltmeter 262 which in turn is connected to the conductor 240. The remaining live contact 264 of the switch 252 is connected to the tap 266 of the adjustable booster auto-transformer 236. A scale 270 is provided for reading the adjusted position of the tap 266 of the auto-transformer 236.

To use this testing apparatus, the connecting means 228 is inserted or connected to any power connection to which it is desired to connect any power appliance. The switch 252 is then thrown to the position shown in the figure wherein the voltmeter 262 is connected directly across the supply connections 230 and 232 to give a no test load voltage reading. The switch means 252 is then operated to move the switch blade 254 into contact with the live contact 250 and the switch blade 260 into contact with the contact 264. The tap 266 is then adjusted until the voltmeter 262 reaches the same value as it would under the no load condition. The position of the tap 266 with reference to the scale 270 indicates the amount of additional voltage which was supplied by the auto-transformer 236 in order to make up for the drop in voltage caused by the application of the test load. The scale 270 is preferably arbitrarily calibrated to indicate directly the "Q" or quality factor of the supply circuit as explained in connection with the scale 70 in the description of Figure 1.

Figure 4:
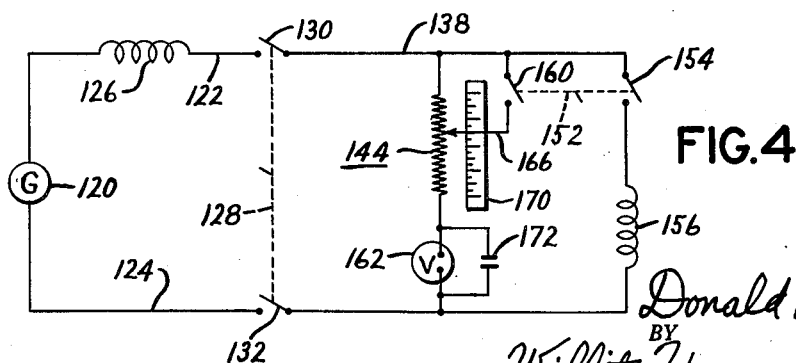
Fig. 4 is a wiring diagram of a testing apparatus embodying a modified form of my invention connected to a source of either alternating or direct current.

In Figure 4, there is shown a generator 120 with supply conductors 122 and 124 having a certain amount of impedance which is represented as the impedance 126. To determine the load carrying ability of the supply circuit I have provided a connecting means 128 providing the connections 130 and 132 with the supply conductors 122 and 124. This connecting means may be in the form of an ordinary receptacle plug on a pair of bare wire ends on switch or any other convenient form.

A potential indicator or voltmeter 162 is connected in series with the adjustable resistance 144 across the conductors 138 and 140 which connect directly to the connections 30 and 32. The voltmeter 162 may be provided with capacitor means 172 connected in shunt with it to keep substantially at unity the power factor of this circuit portion. The adjustable resistance 144 is provided with an adjustable tap 166 connected by the switch 160 to the conductor 138. There is also provided a second switch 154 which is connected in series with an impedance 156 which may for example have a value of 20 ohms for a 115 volt circuit for applying a test load upon the power supply. The switches 160 and 154 may be connected together to provide a double pole switch 152 so that they may be simultaneously opened and closed.

In the use of this apparatus the apparatus is connected to the power supply by making the connections 130 and 132. The voltmeter 162 is then read with the switches 154 and 160 in the open position. Thereafter, the switches 154 and 160 are closed and the tap 166 is adjusted to a position in which the voltmeter will read the same amount as it did with the switches 154 and 160 in the open circuit position. The location of the tap 166 with reference to the scale 170 will give an indication of the ability of the supply line to carry an added load. The apparatus shown in Figure 4, since it contains no transformer, may be used upon a direct current power supply as well as an alternating current power supply.

While the form of embodiment of the invention as herein disclosed, constitutes a preferred form, it is to be understood that other forms might be adopted, as may come within the scope of the claims which follow.

What is claimed is as follows:

1. Apparatus for testing the characteristics of an electrical power supply including supply connecting means for connecting to the power supply, a test load having one terminal connected to one terminal of the supply connecting means, a potential boosting auto transformer having its intermediate terminal also connected to said one terminal of the supply connecting means and having a potential boosting terminal and a third terminal, a potentiometer having an adjustable tap and two fixed terminals, one of said fixed terminals being connected to the intermediate terminal of said auto transformer, the second fixed terminal being connected to said potential boosting terminal, a potential indicator connecting means having one terminal connected to said adjustable tap and a second terminal connected to the second terminal of the supply connecting means, and a switch means for connecting and disconnecting said third terminal of said auto transformer and the second terminal of said test load with the second terminal of said supply connecting means.

2. Apparatus for testing the characteristics of an electrical power supply including supply connecting means for connecting to the power supply, a test load having one terminal connected to one terminal of the supply connecting means, a potential boosting auto transformer having its intermediate terminal also connected to said one terminal of the supply connecting means and having a potential boosting terminal and a third terminal, a potentiometer having an adjustable tap and two fixed terminals, one of said fixed terminals being connected to the intermediate terminal of said auto transformer, the second fixed terminal being connected to said potential boosting terminal, a potential indicator connecting means having one terminal connected to said adjustable tap and a second terminal connected to the second terminal of the supply connecting means, and a switch means for connecting and disconnecting said third terminal of said auto transformer and the second terminal of said test load with the second terminal of said supply connecting means, and a scale showing the extent of adjustment of said adjustable tap to indicate the extent of potential boosting required to make the potential indication the same whether the test load is connected or disconnected.

3. Apparatus for testing the characteristics of an electrical power supply including supply connecting means for connecting to the power supply, a test load, a calibrated adjustable potential boosting means capable of boosting the potential supplied to the supply connecting means and calibrated to read the adjusted position of its movable element, said adjustable potential boosting means including two fixed terminals and an adjustable terminal, conductor and switching means for connecting and disconnecting the test load and the two fixed terminals in parallel circuit across the supply connecting means, and a potential indicator electrical connecting means connected between the adjustable terminal of said potential boosting means and one side of the supply connecting means.

4. Apparatus for testing the characteristics of an electrical power supply including supply connecting means for connecting to the power supply, a test load, a calibrated adjustable potential boosting transformer means capable of boosting the potential supplied to the supply connecting means and calibrated to read the adjusted position of its movable element, said adjustable potential boosting means including two fixed terminals and an adjustable terminal, conductor and switching means for connecting and disconnecting the test load and the two fixed terminals in parallel circuit across the supply connecting means, and a potential indicator electrical connecting means connected between the adjustable terminal of said potential boosting means and one side of the supply connecting means.

DONALD F. ALEXANDER.

REFERENCES CITED

The following references are of record in the file of this patent:

UNITED STATES PATENTS

| Number | Name | Date |
|---|---|---|
| 2,295,578 | Heyer | Sept. 15, 1942 |